(12) United States Patent
Woollard

(10) Patent No.: US 8,333,152 B2
(45) Date of Patent: Dec. 18, 2012

(54) PROJECTILE THAT INCLUDES AN UMBILICAL INTERFACE COVER

(75) Inventor: Bruce R. Woollard, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 172 days.

(21) Appl. No.: 12/839,614

(22) Filed: Jul. 20, 2010

(65) Prior Publication Data
US 2012/0017794 A1    Jan. 26, 2012

(51) Int. Cl.
*F42B 30/08*    (2006.01)
(52) U.S. Cl. ............ 102/501; 102/293; 102/481; 89/1.1
(58) Field of Classification Search .................. 102/473, 102/481, 501, 293; 89/1.1, 1.11; 49/31, 49/70
See application file for complete search history.

(56) References Cited

U.S. PATENT DOCUMENTS

| | | | |
|---|---|---|---|
| 3,972,289 A * | 8/1976 | Morris ......................... | 102/200 |
| 4,478,127 A * | 10/1984 | Hennings et al. ............. | 89/1.55 |
| 5,414,347 A * | 5/1995 | Monk et al. .................. | 324/73.1 |
| 5,614,896 A * | 3/1997 | Monk et al. .................. | 340/945 |
| 6,598,828 B2 * | 7/2003 | Fiebick et al. ............. | 244/118.1 |

* cited by examiner

*Primary Examiner* — James Bergin
(74) *Attorney, Agent, or Firm* — Schwegman Lundberg & Woessner, P.A.

(57) ABSTRACT

Some embodiments pertain to an example projectile that includes an enclosure and an umbilical interface that is exposed on the enclosure. The projectile further includes an umbilical interface cover attached to the enclosure such that the umbilical interface cover protects the umbilical interface. The umbilical interface cover includes a casing and a sensing system inside the casing. The sensing system monitors conditions that the projectile is exposed to until the umbilical interface cover is removed to expose the umbilical interface. The sensing system allows the umbilical interface cover to record data related to the conditions that the projectile is exposed to until the umbilical interface on the projectile is mated to a launcher's umbilical interface. The recorded data may provide valuable information in diagnosing why there was a projectile mission failure.

7 Claims, 4 Drawing Sheets

PROJECTILE THAT INCLUDES AN UMBILICAL INTERFACE COVER

TECHNICAL FIELD

Embodiments pertain to a projectile that includes an umbilical interface, and more particularly to a projectile that includes an umbilical interface cover.

BACKGROUND

Existing projectiles typically include an umbilical interface that is designed to mate with a launcher. An umbilical interface cover is utilized to protect the umbilical interface as the projectile is transported from the manufacturing facility to storage (at one or more locations). The umbilical interface cover remains on the projectile to provide protection to the umbilical interface until the umbilical interface cover is removed to expose the umbilical interface and permit the umbilical interface to be mated with the launcher.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As used herein, projectile refers to missiles, guided projectiles, unguided projectiles, gliders, unmanned aerial vehicles and sub-munitions.

Figure 1:
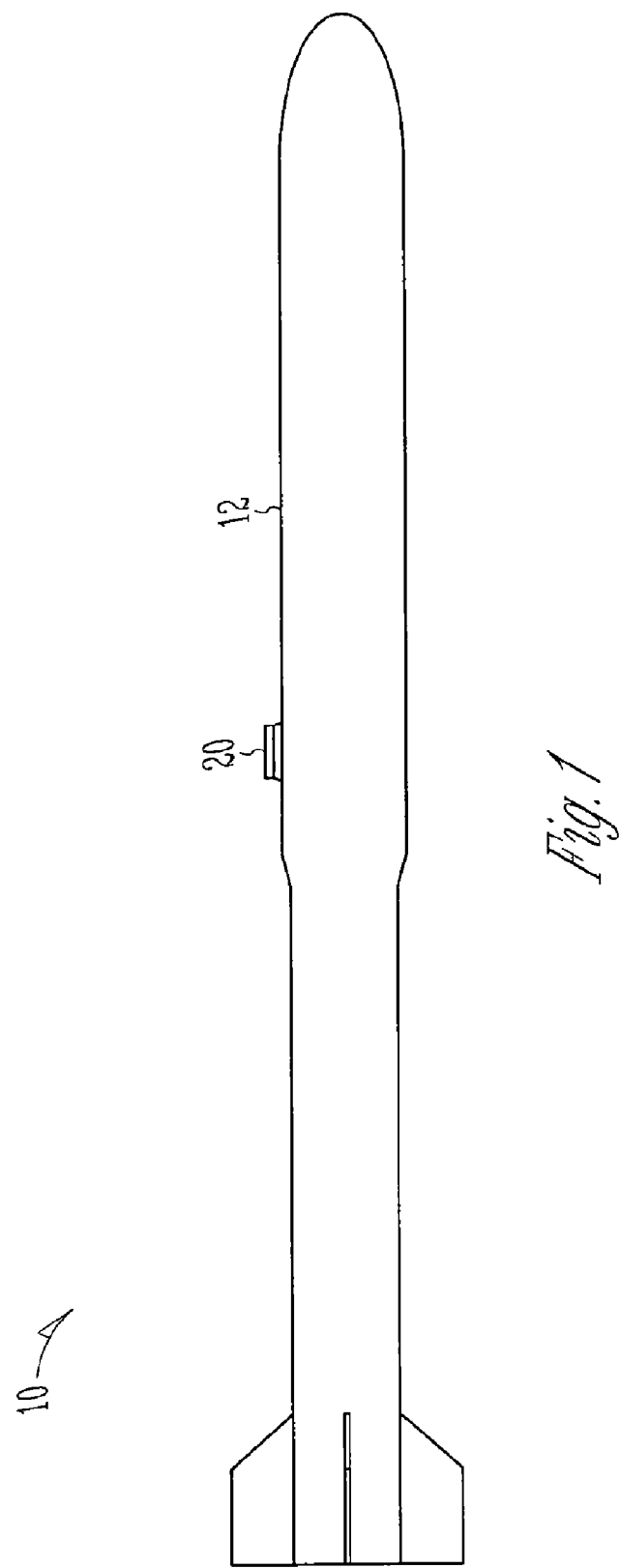
FIG. 1 is a side view of an example projectile.
Figure 2:
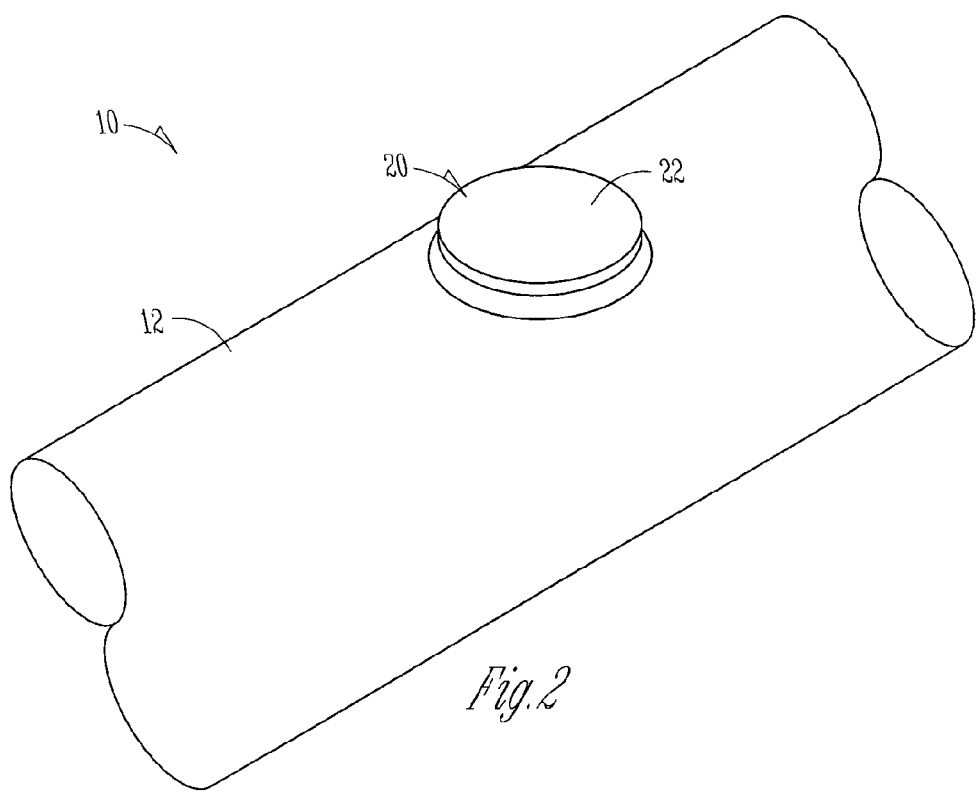
FIG. 2 is a perspective view of an enlarged portion of the projectile shown in FIG. 1 with an umbilical interface cover protecting an umbilical interface.
Figure 3:
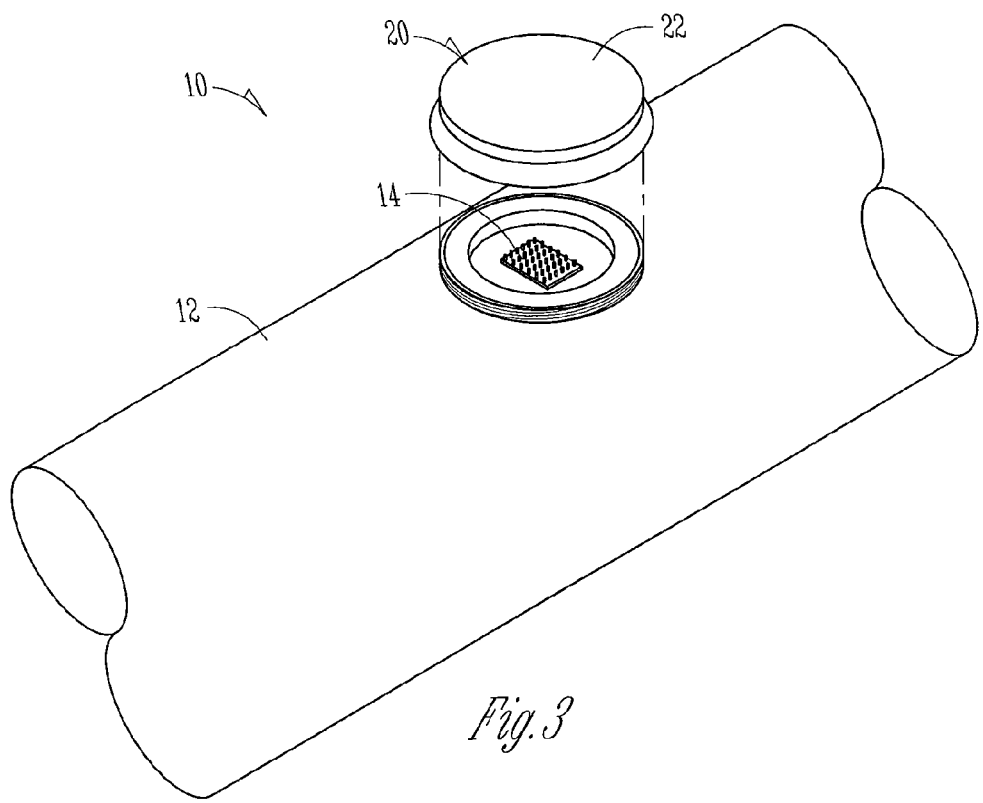
FIG. 3 is a perspective view similar to FIG. 2 with the umbilical interface cover removed to expose the umbilical interface.
Figure 4:
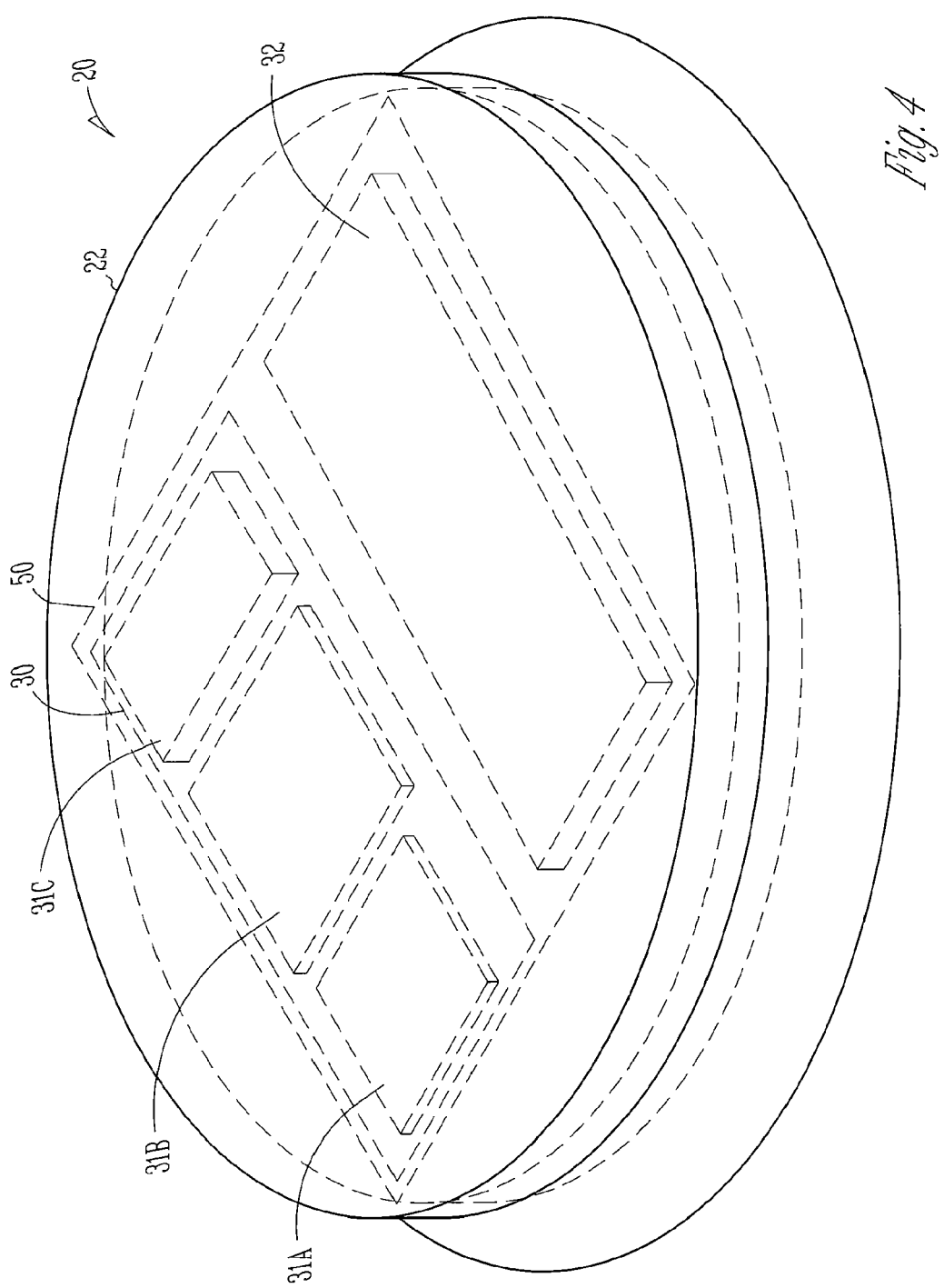
FIG. 4 is a perspective view of the example umbilical interface cover shown in FIGS. 1-3.
Figure 5:
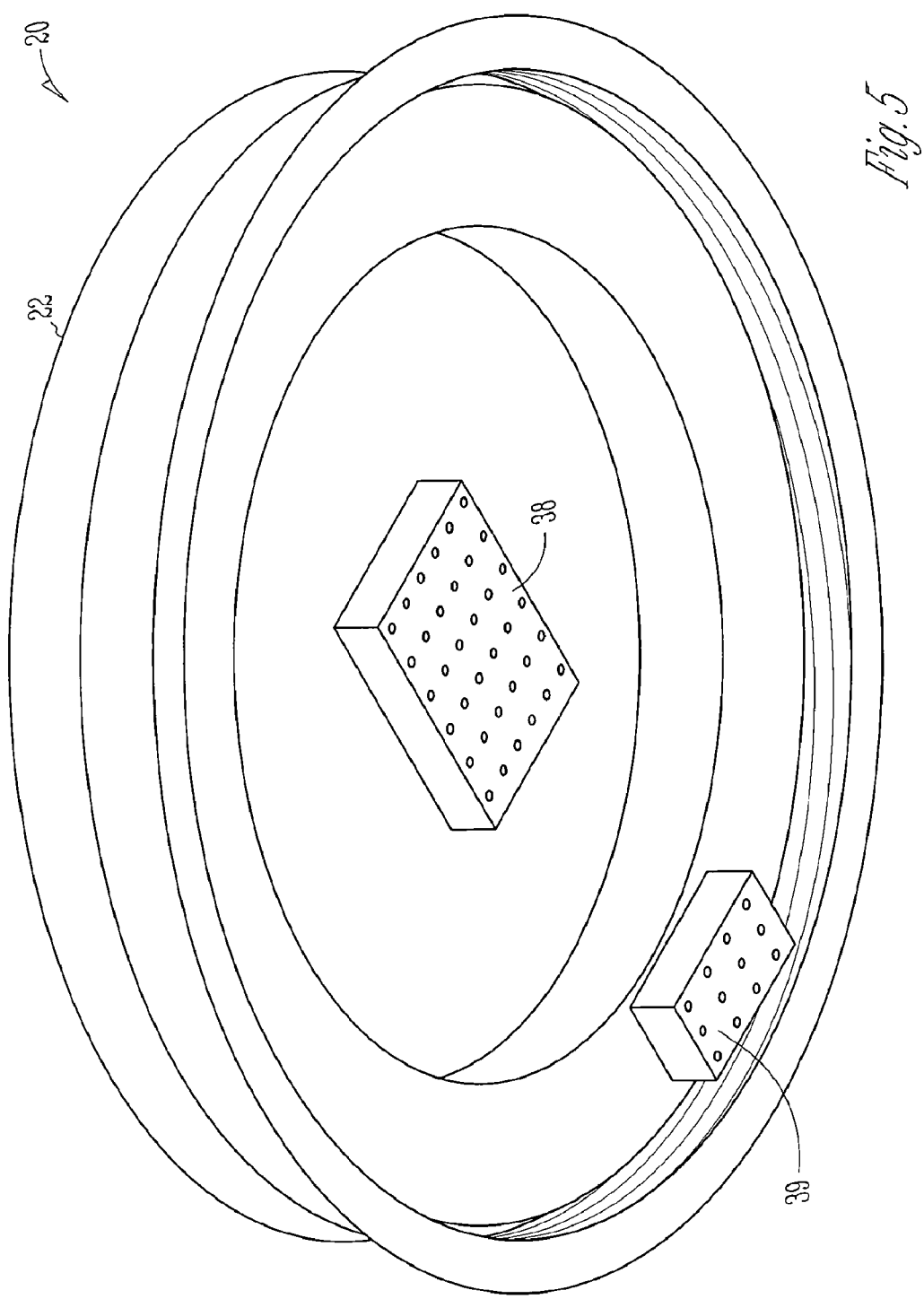
FIG. 5 is another perspective view of the example umbilical interface cover shown in FIGS. 1-3.

FIGS. 1-3 illustrate an example projectile 10. The projectile 10 includes an enclosure 12 and an umbilical interface 14 (shown in FIG. 3 only) that is exposed on the enclosure 12. The projectile 10 further includes an umbilical interface cover 20 attached to the enclosure 12 such that the umbilical interface cover 20 protects the umbilical interface 14. As shown in FIGS. 4 and 5, the umbilical interface cover 20 includes a casing 22 and a sensing system 30 (shown in FIG. 4 only) inside the casing 22.

The sensing system 30 monitors conditions that the projectile 10 is exposed to until the umbilical interface cover 20 is removed to expose the umbilical interface 14 (FIG. 3). The sensing system 30 allows the umbilical interface cover 20 to record data related to the environments that the projectile 10 is exposed to until the umbilical interface 14 on the projectile 10 is mated to a launcher umbilical interface. The data collected may provide valuable information in diagnosing why there was a projectile 10 mission failure.

It should be noted that the sensing system 30 may include a variety of active and/or passive sensors (e.g., Micro Electro Mechanical System sensors). In the example embodiment that is illustrated in FIG. 4, the sensing system 30 includes three sensors 31A, 31B, 31C, although any number and type of sensors may be provided depending in part on the type of environmental information that needs to be obtained. As an example, one or more of the sensors 31A, 31B, 31C, may monitor the (i) temperature; (ii) shock; (iii) humidity; (iv) vibration; and/or (v) acceleration that the projectile 10 is exposed to until the umbilical interface cover 20 is removed to expose the umbilical interface 14.

In the illustrated example embodiment, the sensing system 30 includes memory 32 to store data related to conditions that the projectile 10 is exposed to until the umbilical interface cover 20 is removed to expose the umbilical interface 14. Some example conditions include but are not limited to one or more of temperature, shock, vibration, humidity, and acceleration, wherein the data is accessible for later diagnosis of a projectile 10 failure.

In some embodiments, the sensing system 30 stores data related to the conditions that the projectile 10 is exposed to until the umbilical interface cover 20 is removed to expose the umbilical interface 14. As an example, the sensing system 30 may monitor the date and time when the conditions that effect the projectile 10 occur and store the relevant data for later analysis.

The umbilical interface cover 20 may be designed so that it provides protection to a variety of different types of umbilical interfaces. In addition, the umbilical interface cover 20 may be designed so that it can be attached to a variety of different types of projectiles. The size, shape and style of the umbilical interface cover 20 will depend in part on the type of umbilical interface 14 that needs protection as well as the type of projectile 10 on which the particular umbilical interface 14 is exposed. It should be noted that although FIGS. 3 and 5 show the umbilical interface cover 20 and the projectile 10 as being adapted to be threadingly engaged, the umbilical interface cover 20 may be mated to the projectile 10 in any manner that provides a secure connection between the umbilical interface cover 20 and the projectile 10.

In some embodiments, the umbilical interface cover 20 may store information (in hardware or software) that identifies the particular projectile 10 where that particular umbilical interface cover 20 is attached. As an example, an aircrew person may remove and retain the umbilical interface cover 20. The umbilical interface cover 20 may then be sent back to a lab for analysis which may prove particularly useful if that particular projectile 10 mission fails for some unknown reason.

The umbilical interface cover 20 may also include a data removal connector 39 (FIG. 5) that can be used to extract the data from the umbilical interface cover 20. The type of data removal connector 39 will depend in part on the size, shape and style of the rest of the umbilical interface cover 20. In other embodiments, the umbilical interface cover 20 may be configured to extract data from the umbilical interface cover 20 via a wireless connection with the umbilical interface cover 20.

In some embodiments, the sensing system 30 may include a part of a global positioning system (i.e., GPS). When the umbilical interface cover 20 includes part of a global positioning system, the umbilical interface cover 20 would be able to record the location of the projectile 10 until the umbilical interface cover 20 is removed to expose the umbilical interface 14.

In addition, the umbilical interface cover 20 may include a mating connector 38 (FIG. 5) that engages the umbilical interface 14. This type of mating connection may serve to provide additional protection to the umbilical interface 14, especially when the umbilical interface 14 includes a number of smaller and more fragile parts.

In some embodiments, the sensing system 30 may be able to detect tampering with the projectile 10. As an example, the sensing system 30 may be able to establish that the umbilical interface cover 20 was removed prematurely. In addition, the umbilical interface cover 20 may be able to determine whether someone has tried to gain unauthorized access to the projectile 10.

FIG. 4 shows an example system 50 for monitoring conditions that a projectile 10 is exposed to prior to removal of an umbilical interface cover 20. The system includes a memory 32 and a sensing system 30 to store data in the memory 32 related to conditions that the projectile 10 is exposed to until the umbilical interface cover 20 is removed to expose an umbilical interface 14.

In some embodiments, the conditions include one or more of temperature, shock, vibration, humidity, and acceleration. As discussed above, the data may be accessible for later diagnosis at least in the event of a projectile 10 failure.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A projectile comprising:
   an enclosure;
   an umbilical interface exposed on the enclosure; and
   an umbilical interface cover attached to the enclosure such that the cover protects the umbilical interface, the umbilical interface cover including a casing and a sensing system inside the casing, wherein the sensing system monitors conditions that the projectile is exposed to until the umbilical interface cover is removed to expose the umbilical interface.

2. The projectile of claim 1, wherein the projectile is a missile.

3. The projectile of claim 1, wherein the sensing system monitors the temperature that the projectile is exposed to until the umbilical interface cover is removed.

4. The projectile of claim 1, wherein the sensing system detects tampering with the projectile.

5. The projectile of claim 1, wherein the sensing system stores data related to conditions that the projectile is exposed to until the umbilical interface cover is removed to expose the umbilical interface.

6. The projectile of claim 1, wherein the umbilical interface cover includes a mating connector that engages the umbilical interface.

7. The projectile of claim 1 wherein the sensing system includes memory to store data related to conditions that the projectile is exposed to until the cover is removed to expose the umbilical interface,
   wherein the data is accessible for later diagnosis of a projectile failure.

\* \* \* \* \*